United States Patent
Jones

[11] Patent Number: 6,138,357
[45] Date of Patent: Oct. 31, 2000

[54] METHOD OF MAKING KNUCKLE ASSEMBLY

[75] Inventor: Robert Allen Jones, Canton, Mich.

[73] Assignee: Ford Global Technologies, Inc., Dearborn, Mich.

[21] Appl. No.: 08/986,589

[22] Filed: Dec. 8, 1997

[51] Int. Cl.[7] .................................................. B21D 53/88
[52] U.S. Cl. ..................... 29/897.2; 280/93.512
[58] Field of Search .......................... 280/93–512, 781, 280/124.125, 124.128, 124.134, 124.116; 29/897.2

[56] References Cited

U.S. PATENT DOCUMENTS

| | | |
|---|---|---|
| 2,435,814 | 2/1948 | Allison . |
| 3,147,026 | 9/1964 | Schilberg . |
| 3,446,513 | 5/1969 | Weiertz . |
| 3,801,124 | 4/1974 | Afanador et al. . |
| 3,865,394 | 2/1975 | Epner et al. . |
| 4,705,145 | 11/1987 | Goulart . |
| 4,722,540 | 2/1988 | Kozyra et al. . |
| 5,366,233 | 11/1994 | Kozyra et al. . |

FOREIGN PATENT DOCUMENTS

| | | |
|---|---|---|
| 0 185 899 A2 | 7/1986 | European Pat. Off. . |
| 0 473 876 A1 | 3/1992 | European Pat. Off. . |

*Primary Examiner*—P. W. Echols
*Assistant Examiner*—John C. Hong
*Attorney, Agent, or Firm*—Raymond J. Coppielli

[57] ABSTRACT

A method of forming a knuckle assembly for an automotive vehicle is disclosed, the method comprising the steps of forming a front and back half of a knuckle assembly and welding the front and back halves together. A spindle is positioned through holes formed in the front and back halves of the knuckle and is secured thereto to provide a low cost, light weight knuckle assembly for an automotive vehicle.

10 Claims, 3 Drawing Sheets

METHOD OF MAKING KNUCKLE ASSEMBLY

BACKGROUND OF THE INVENTION

1. Field of the Invention

The present invention relates generally to motor vehicles suspension components. More particularly, the present invention relates to a method of forming a knuckle assembly for an automotive vehicle.

2. Disclosure Information

Conventional knuckle assemblies are typically constructed as a one-piece forged or cast housing. Attached to these integral units are wheel bearing carriers, torque arms, disc-type brake calipers, ball joints, struts, steering links and other suspension components. Although conventional steering knuckles perform satisfactorily, it is desirable to optimize production costs and enhance structural characteristics in the knuckle design.

It is particularly desirable to reduce the weight of the steering knuckle assembly. Weight reductions in this area are advantageous since they reduce both the total vehicle weight and the suspension unsprung mass. Reducing the unsprung mass provides significant improvements in the ride and handling of the vehicle. Overall, weight reductions help to improve both performance and fuel efficiency in the vehicle.

It is an object of the present invention to provide a method for forming a vehicle wheel knuckle assembly from a pair of stamped members. By forming the knuckle in this manner, significant weight and cost savings can be achieved.

SUMMARY OF THE INVENTION

The present invention overcomes the problems associated with the prior art by providing a method of forming a knuckle assembly for an automotive vehicle. The method comprises the steps of forming a front half of a knuckle assembly from a deformable material and forming a back half of the knuckle assembly from the same material. The front and back halves are then secured together along a weld seam and a wheel-carrying spindle is positioned through the back half of the knuckle assembly to extend through the front half of the knuckle assembly. The spindle is welded at predetermined locations on the back and front halves of the knuckle assemblies. In one preferred embodiment of the present invention, the front and back halves of the knuckle assembly each includes a generally frusto-conical shaped member or depression through which wheel spindle extends. These depressions provide structural rigidity to the stamped members and allow for alignment of the spindle more easily.

By producing knuckle assemblies in this manner, the weight of the assembly can be significantly reduced and the cost is also reduced. These and other advantages of the present invention will become apparent from the drawings, detailed description and claims which follow.

DETAILED DESCRIPTION OF THE PREFERRED EMBODIMENTS

Figure 1:
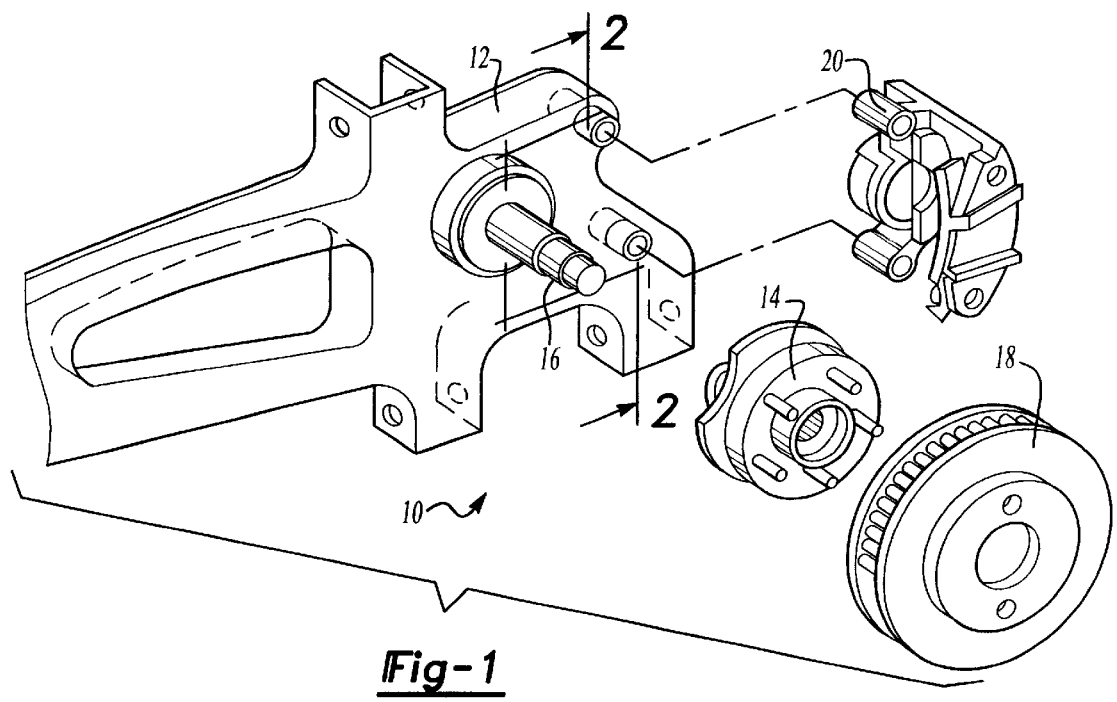
FIG. 1 is a perspective view of a knuckle assembly structured in accord with the principles of the present invention.
Figure 2:
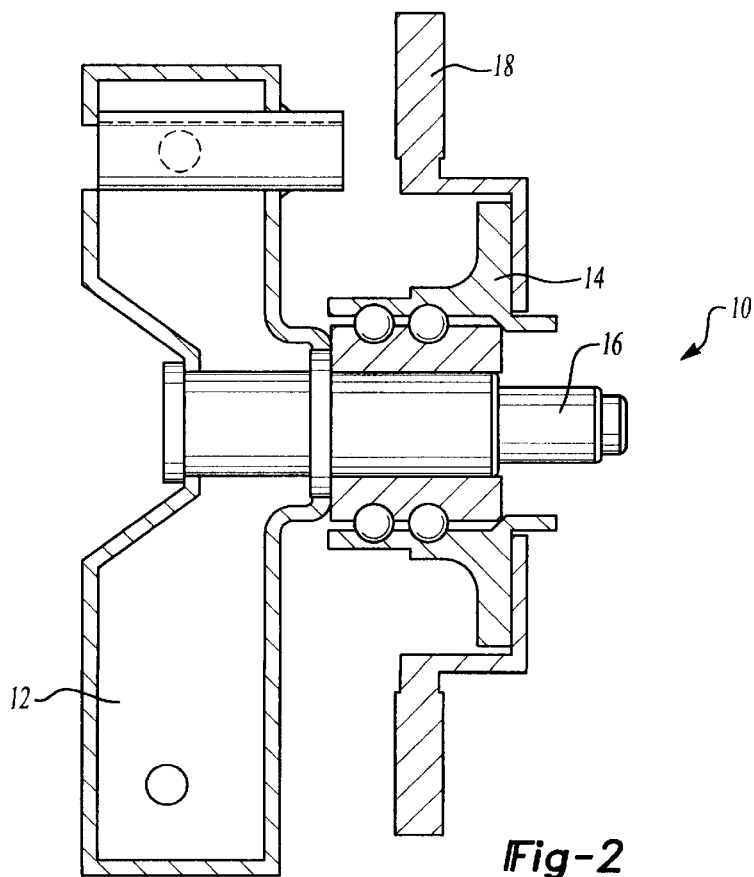
FIG. 2 is a cross section of FIG. 1 taken along lines 2—2 in FIG. 1.

A knuckle assembly in accordance with the present invention is shown in the drawings and generally designated by the reference character 10. The primary components of knuckle assembly 10 are knuckle housing 12 and bearing carrier 14. Knuckle assembly 10 is designed to support a wheel spindle 16 and a brake rotor and hub 18 as well as to for rotation and provide a mounting location for a disc brake caliper assembly 20. Knuckle assembly 10 further provides mounting points for various suspension components, such as ball joints and steering links. Alternately, the knuckle assembly 10 could be configured to accept all the types of suspension components such as strut types suspension units, etc. A knuckle assembly 10 described and illustrated herein is intended for use with a driven axle. The novel features of this invention, however, are also applicable to non-driven configurations.

Figure 3:
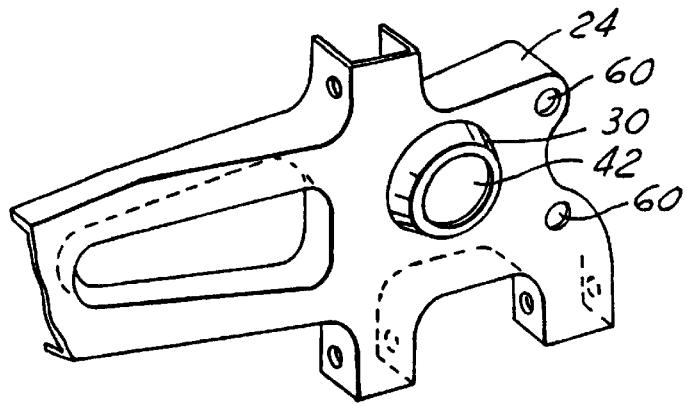
FIG. 3 is a perspective view of the front portion of the knuckle assembly of the present invention.
Figure 4:
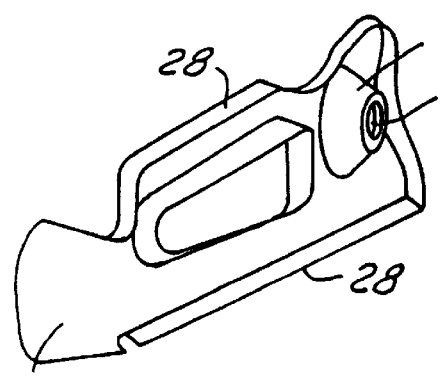
FIG. 4 is a perspective view of the back half of the knuckle assembly of the present invention.

As shown in FIGS. 3 and 4, the knuckle assembly of the present invention is formed from two stamped pieces, a front half knuckle member 24 and a back half knuckle member 26. Each of these halves are stamped from a deformable material, such as a low carbon steel alloy. The front half knuckle member 24 includes a peripheral flange 28 extending around one side thereof to which the back half knuckle member 26 is welded to form a completed knuckle housing. The back half member 26 and front half member 24 are welded together along a longitudinal axis of the assembly (L-L). The weld seam is placed in a vertical plane extending longitudinally through the knuckle assembly. This provides increased strength in torsional loading occurrences over prior art two piece knuckle assemblies wherein the weld seam is located along or in a horizontal plane. Spot welds could also be used in place of a weld seam along the entire longitudinal length of the knuckle assembly. This would decrease manufacturing complexity.

Each of the front 24 and back 26 halves further includes a generally frusto-conical depression 30, 32 formed therein. Each of these depressions includes a generally tapering wall 34, 36 having a planar flat portion 38, 40 at the end of the depression. Through these walls 38, 40, apertures 42, 44 are formed for receiving the wheel spindle 16 therethrough. In the preferred embodiment, the aperture 38 in the front half 24 is larger than the aperture 40 in the back half 26, allowing the spindle to be inserted into the knuckle from the front.

Figure 5:
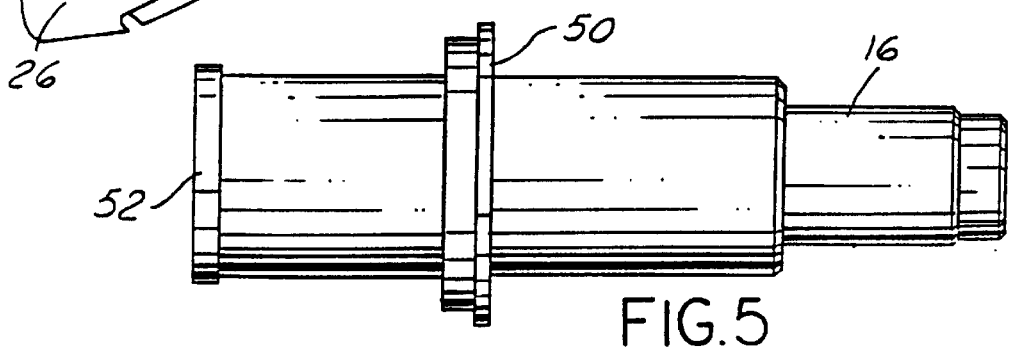
FIG. 5 is a cross sectional view of a wheel spindle used in accordance with the method of the present invention.
Figure 6:
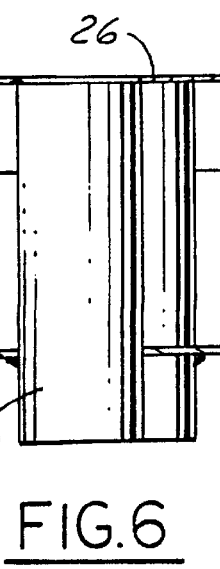
FIG. 6 is a cross sectional view taken along line 6—6 of FIG. 1 of the present invention.

FIG. 5 shows a typical spindle 16 configuration for use with a knuckle assembly 10 of the present invention. The spindle 16 can be fabricated as a solid piece or, to decrease the weight of the spindle, be formed from two stamped or cast members welded together. As shown in FIG. 5, the spindle assembly 16 includes a pair of flange members 50, 52 extending circumferencially around the circumference of the spindle. These flange members 50, 52 engage the flat planar walls 38, 40 of each of the frusto-conical depressions 30, 32 in the front 24 and back 26 members of the knuckle assembly 10. The flanges 50, 52 on the spindle 16 are then welded to the frusto-conical depressions 30, 32 of the knuckle members 24, 26. The frusto-conical depressions further provide for exacting alignment of the wheel spindle. It is a critical dimension that the wheel spindle be perfectly aligned and this is a accomplished through the use of the frusto-conical depressions 30, 32.

Figure 7:
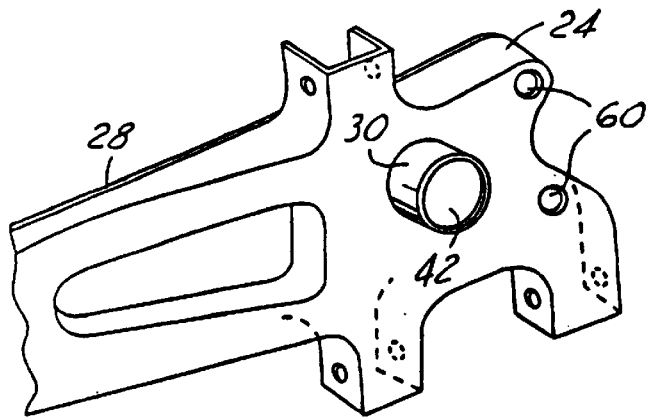
FIG. 7 is a perspective view of a front portion of the knuckle assembly of an alternative embodiment of the present invention.
Figure 8:
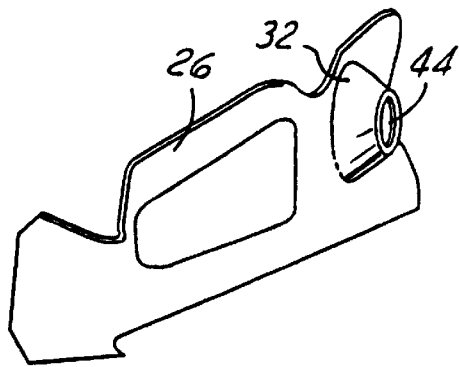
FIG. 8 is a perspective view of a back half of the knuckle assembly of an alternative embodiment of the present invention.
Figure 9:
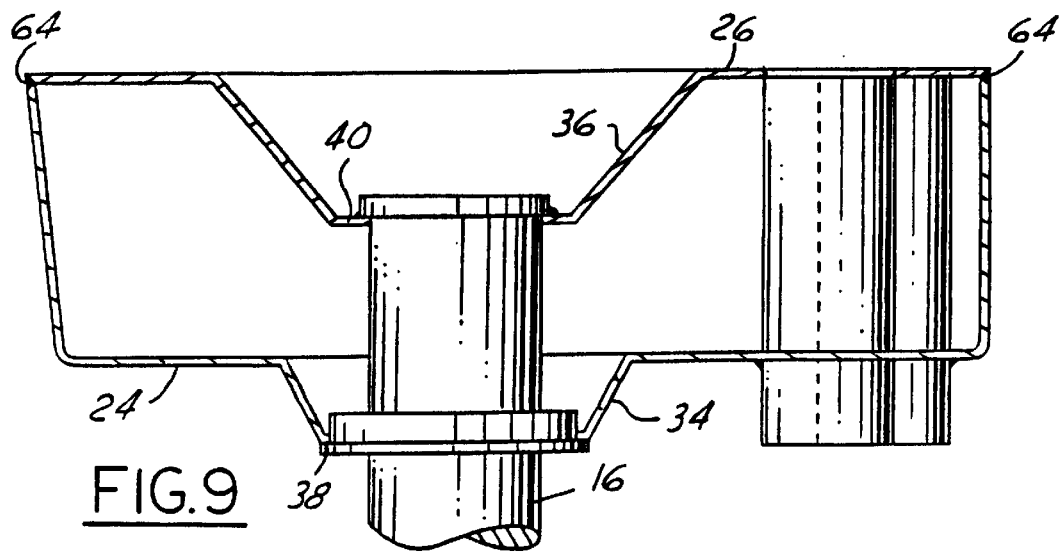
FIG. 9 is a cross sectional view of the assembled front and back knuckle halves of FIGS. 7 and 8.

To complete the assembly of the knuckle assembly 10 of the present invention, the front 24 and back 26 halves of the assemblies are welded together, either with a continuous weld or by spot welds, along the weld seam 56 as described above. Alternatively, as shown in FIGS. 7–9, the back half member 26 can be a generally flat member. This member 26 can be welded to the front half member 24 at various points 64 or along the entire interface between the members 24, 26. The spindle 16 is inserted through the frusto-conical depressions 30, 32 such that the flange members 50, 52 on the spindle engage the generally planar ends of the conical depressions. The spindle 16 is then welded to these depressions. The bearing holder and bearing assemblies and hub can then be added to the assembly to provide a completed knuckle assembly.

In addition, the knuckle assembly of the present invention can also include mounting holes 60 for the disc brake caliper assemblies. By providing apertures 60 in the front half member 24 or in back half member 26, a cheaper and more cost effective knuckle assembly can be fabricated. The caliper assemblies are secured to the knuckle assemblies by the use of threaded fasteners which project through the apertures to engage a retaining block located beneath or between the front and back halves of the assemblies. Alternatively, the knuckle assembly of the present invention can be fabricated with mounting holes for a drum brake assembly. This would require additional apertures being formed around the spindle.

Figure 10:
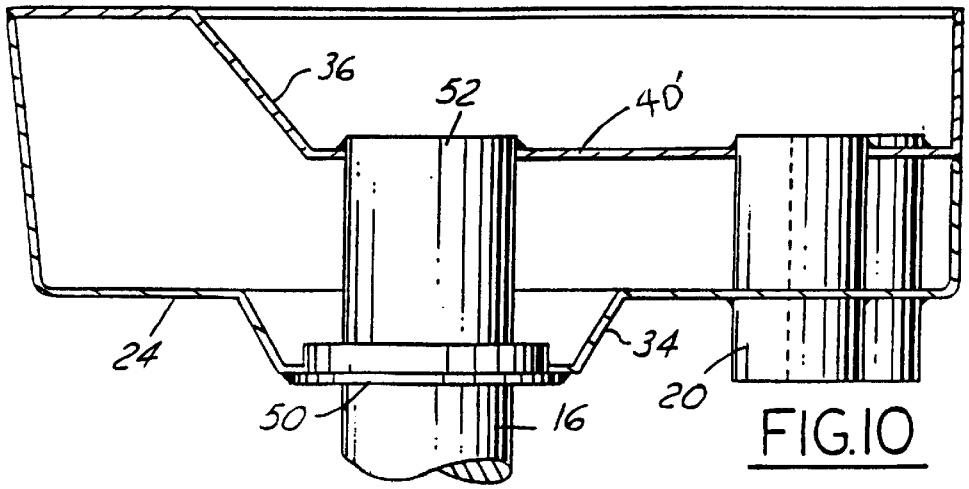
FIG. 10 is an alternative embodiment of the present invention.

FIG. 10 illustrates another embodiment of the present invention. In FIG. 10, the frusto-conical depression 40' formed in the back half 26 of the assembly extends across the back half member 26 a much greater distance than the previously described embodiment. This allows the brake assembly mounting 20 to be secured to the frusto-conical portion instead of to the rear face of the back half 26.

Various modifications to the present invention will no doubt occur to those skilled in the art. For example, the knuckle assembly can be fabricated without the frusto-conical depressions. Also, the knuckle assembly shown and illustrated herein includes a large opening therein. This large opening is essentially for weight saving purposes only. Furthermore, the longitudinal length of the knuckle assembly can be shortened to accommodate the design specifications required for a particular vehicle. It is the following claims, including all the equivalents which define this scope of my invention.

What is claimed is:

1. A method of forming a knuckle assembly for an automotive vehicle, comprising the steps of:

forming a front half of a knuckle assembly from a deformable material;

forming a back half of a knuckle assembly from a deformable material;

securing the front half and the back half to each other along a weld seam;

positioning a spindle through the back half and the front half of the knuckle assembly by extending it through the front half of the knuckle assembly first; and welding the spindle at a predetermined location on the back half and at a predetermined location on the front half of the knuckle assembly.

2. A method according to claim 1, wherein the step of forming the front half of the knuckle assembly further includes the step of forming a spindle-receiving aperture in the front half of the assembly.

3. A method according to claim 1, wherein the step of forming the back half of the knuckle assembly further includes the step of forming a spindle-receiving aperture in the back half of the assembly.

4. A method according to claim 1, further including forming a frusto-conical shaped depression in the back half of the knuckle assembly, and forming a spindle-receiving aperture therein.

5. A method according to claim 1, further including forming a frusto-conical shaped depression in the front half of the knuckle assembly, and forming a spindle-receiving aperture therein.

6. A method according to claim 1, further including the step of forming brake receiving apertures in the front half of the knuckle assembly.

7. A method according to claim 1, further including the step of forming a flange on the spindle member configured to engage the spindle-receiving aperture on the front half of the knuckle assembly.

8. A method according to claim 1, wherein the step of securing the front half and the back half to each other along a weld seam further includes the step of forming the weld seam along the longitudinal axis of the knuckle assembly in a vertical, longitudinal plane.

9. A method according to claim 1, wherein the steps of forming the front half and back half of the knuckle assemblies includes the step of stamping the front and back halves from a steel alloy.

10. A method of forming a knuckle assembly for an automotive vehicle, comprising the steps of:

stamping a front half of a knuckle assembly from a deformable material, said step including forming a frusto-conical shaped depression therein, the depression having a planar portion with a spindle-receiving aperture formed therein;

stamping a back half of a knuckle assembly from a deformable material, said step including forming a depression therein, the depression having a planar portion extending a distance greater than a diameter of the front half depression, and having a spindle-receiving aperture formed therein;

welding the front half and the back half of the knuckle assembly to each other along a weld seam located along a longitudinal axis and in a vertical plane of the knuckle assembly;

positioning a spindle through the apertures in the depressions in the front half and the back half of the knuckle assembly by extending it through the depression in the front half of the knuckle assembly first; and welding the spindle in the depressions in the front and back halves of the knuckle assembly.

* * * * *